United States Patent
Aya et al.

(10) Patent No.: US 11,586,621 B1
(45) Date of Patent: Feb. 21, 2023

(54) PARALLEL SCAN OF SINGLE FILE USING MULTIPLE THREADS

(71) Applicant: Snowflake Inc., Bozeman, MT (US)

(72) Inventors: Selcuk Aya, San Carlos, CA (US); Thierry Cruanes, San Mateo, CA (US); Florian Andreas Funke, San Francisco, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/586,493

(22) Filed: Jan. 27, 2022

(51) Int. Cl.
*G06F 16/00* (2019.01)
*G06F 16/2453* (2019.01)

(52) U.S. Cl.
CPC .. *G06F 16/24532* (2019.01); *G06F 16/24542* (2019.01)

(58) Field of Classification Search
CPC ............... G06F 16/24532; G06F 16/24542
See application file for complete search history.

(56) References Cited

U.S. PATENT DOCUMENTS

| | | | |
|---|---|---|---|
| 5,666,524 A * | 9/1997 | Kunkel | G06F 16/24532 715/255 |
| 6,507,834 B1 * | 1/2003 | Kabra | G06F 16/2443 707/774 |
| 8,543,596 B1 * | 9/2013 | Kostamaa | G06F 16/182 711/202 |
| 2003/0037048 A1 * | 2/2003 | Kabra | G06F 16/24532 |
| 2006/0212542 A1 * | 9/2006 | Fang | H04L 67/104 709/219 |
| 2016/0378824 A1 * | 12/2016 | Li | G06F 16/24532 707/715 |
| 2018/0032478 A1 * | 2/2018 | Felderman | H04L 67/02 |
| 2018/0115512 A1 * | 4/2018 | Otsubo | H04L 67/06 |
| 2018/0150513 A1 * | 5/2018 | Willems | G06F 16/2455 |
| 2018/0373759 A1 * | 12/2018 | Uthappa | G06F 16/2454 |
| 2021/0081409 A1 * | 3/2021 | Rath | G06F 11/3409 |
| 2022/0075771 A1 * | 3/2022 | Li | G06F 9/4843 |

* cited by examiner

*Primary Examiner* — Alexander Khong
(74) *Attorney, Agent, or Firm* — Schwegman Lundberg & Woessner, P.A.

(57) ABSTRACT

Multiple execution threads process a query directed to a database organized into a plurality of files. In processing the query, a first thread downloads a file from the plurality of files. The file comprises a set of blocks. A parallel scan of the set of blocks is performed by at least the first thread and a second thread to identify data that matches the query. A response to the query is provided based in part on the parallel scan of the set of blocks.

30 Claims, 8 Drawing Sheets

PARALLEL SCAN OF SINGLE FILE USING MULTIPLE THREADS

TECHNICAL FIELD

Embodiments of the disclosure relate generally to data platforms and databases and, more specifically, to performance of a parallel scan of a single file using multiple threads.

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Databases are used by various entities and companies for storing information that may need to be accessed or analyzed. Various operations performed on a database, such as joins and unions, involve combining query results obtained from different data sources (e.g., different tables, possibly on different databases) into a single query result.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
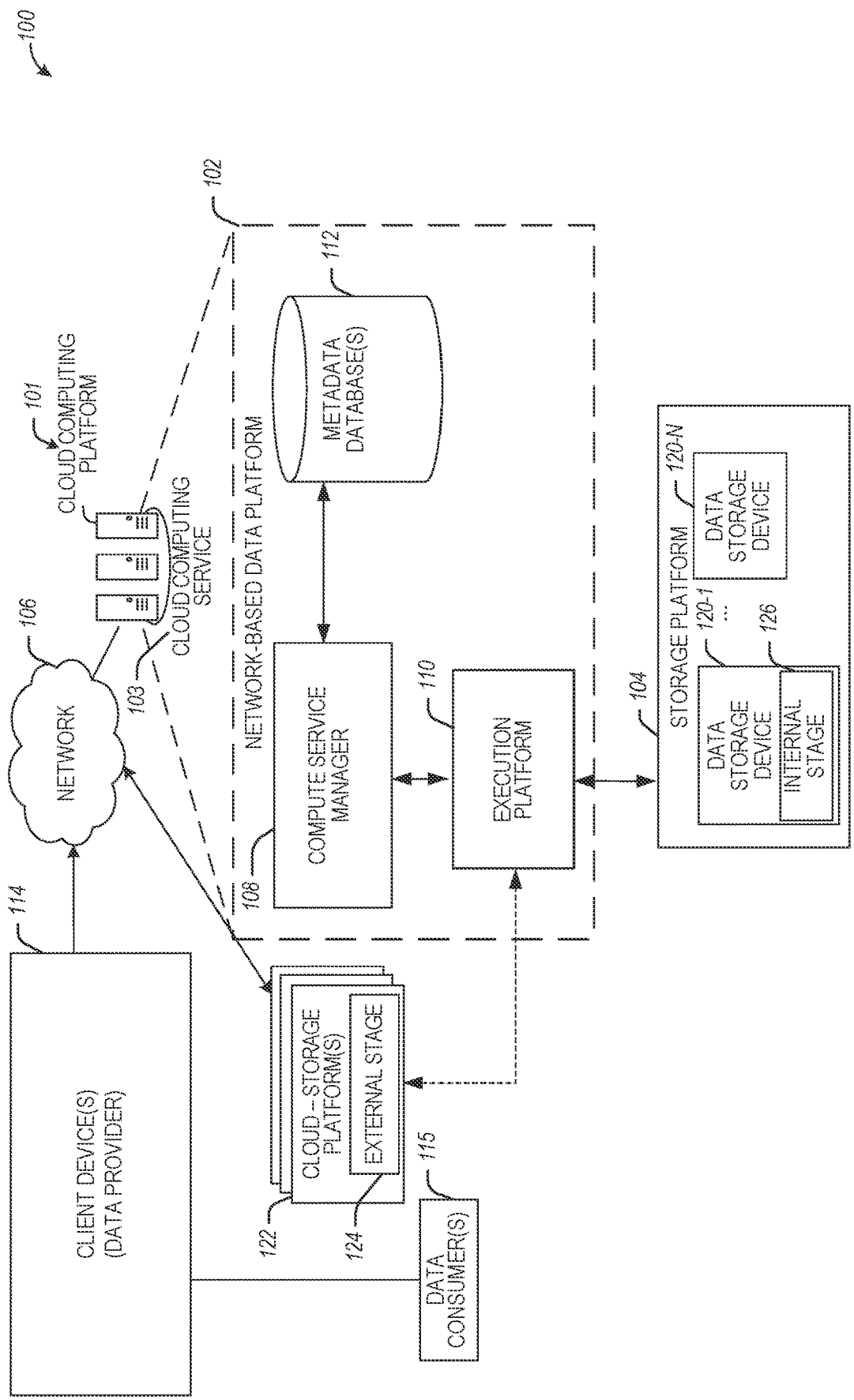
FIG. 1 illustrates an example computing environment that includes a network-based data platform, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Data platforms are widely used for data storage and data access in computing and communication contexts. Concerning architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

In a typical implementation, a data platform includes one or more databases that are maintained on behalf of a customer account. The data platform may include one or more databases that are respectively maintained in association with any number of customer accounts, as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata in association with the data platform in general and in association with, as examples, particular databases and/or particular customer accounts as well.

Users and/or executing processes that are associated with a given customer account may, via one or more types of clients, be able to cause data to be ingested into the database, and may also be able to manipulate the data, add additional data, remove data, run queries against the data, generate views of the data, and so forth.

In an example implementation of a data platform, a given database is represented as an account-level object within a customer account, and the customer account may also include one or more other account-level objects such as users, roles, and/or the like. Furthermore, a given account-level database object may itself contain one or more objects such as tables, schemas, views, streams, tasks, and/or the like.

A given table may be organized as records (e.g., rows) that each include one or more attributes (e.g., columns). A data platform may physically store database data in multiple storage units, which may be referred to as blocks, micro-partitions, and/or by one or more other names. In an example, a column of a database can be stored in a block and multiple blocks can be grouped into a single file. That is, a database can be organized into a set of files where each file includes a set of blocks. Consistent with this example, for a given column, all blocks are stored contiguously and blocks for different columns are row aligned. Data stored in each block can be compressed to reduce its size. A block storing compressed data may also be referred to as a "compression block" herein.

For various implementations of a data platform, a cluster of execution nodes can be used to execute tasks (e.g., workload) with respect to the data platform, such as execution of a query. The cluster of execution nodes allows for multiple threads of execution for executing a given task. In executing a query, a table scan is performed whereby files are scanned by one or more execution nodes to identify data matching the query. The files that are scanned may correspond to a subset of the files of a database referred to as a scan set, which is determined through a process that includes pruning. Pruning involves using metadata to determine which portions of a table, including which files or file groupings in the database, are not pertinent to a query, and then avoiding those non-pertinent files when responding to the query by scanning only the pertinent micro-partitions to generate a query response. In conventional data platforms, the processing capability of the execution nodes is often underutilized when a single thread is responsible for downloading and scanning a file, especially if there are fewer files available to process compared to the number of available execution threads.

Aspects of the present disclosure include systems, methods, and devices to address, among other problems, the aforementioned shortcomings of conventional data platforms by performing a parallel scan of a single file by multiple threads. In an example, a data platform receives a query directed to a database organized into a set of files where each file comprises a set of blocks. Execution of the query is, as mentioned above, performed by multiple threads of execution. More specifically, a first thread accesses a file of the database (e.g., from a scan set determined through pruning) and the set of blocks of the file are distributed among the multiple threads for parallel scanning. The multiple threads perform a parallel scan of the set of blocks in accordance with this distribution and a query result is provided based at least in part on the parallel scan.

By performing a parallel scan in this manner, the data platform increases utilization of execution node processing capability by allowing more threads to process data from a single file. Moreover, with the parallel scan technique described herein, data for the whole file is downloaded only once, but each thread scans a different subset of blocks thereby avoiding any IO penalty while increasing processor utilization. Parallel scanning in this manner also leads to more threads performing processing for operators following the table scan. For example, if a filter and aggregation operator consume data sent by the table scan and aggregates data, more threads will be doing the processing for filtering and aggregating data in parallel, increasing the processing utilization.

FIG. 1 illustrates an example computing environment 100 that includes a data platform in the example form of a network-based data platform 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some aspects, the computing environment 100 may include a cloud computing platform 101 with the network-based data platform 102, and a storage platform 104 (also referred to as a cloud storage platform). The cloud computing platform 101 provides computing resources and storage resources that may be acquired (purchased) or leased and configured to execute applications and store data.

The cloud computing platform 101 may host a cloud computing service 103 that facilitates storage of data on the cloud computing platform 101 (e.g., data management and access) and analysis functions (e.g., SQL queries, analysis), as well as other processing capabilities (e.g., parallel execution of sub-plans as described herein). The cloud computing platform 101 may include a three-tier architecture: data storage (e.g., storage platforms 104 and 122), an execution platform 110 (e.g., providing query processing), and a compute service manager 108 providing cloud services.

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types-on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform as what is referred to herein as an internal storage location concerning the data platform.

From the perspective of the network-based data platform 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based data platform 102 of the cloud computing platform 101 is in communication with the cloud storage platforms 104 and 122 (e.g., AWS®, Microsoft Azure Blob Storage®, or Google Cloud Storage). The network-based data platform 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based data platform 102.

The network-based data platform 102 comprises a compute service manager 108, an execution platform 110, and one or more metadata databases 112. The network-based data platform 102 hosts and provides data reporting and analysis services to multiple client accounts.

The compute service manager 108 coordinates and manages operations of the network-based data platform 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based data platform 102. A user may utilize the client device 114 to submit data storage, retrieval, and analysis requests to the compute service manager 108. Client device 114 (also referred to as user device 114) may include one or more of a laptop computer, a desktop computer, a mobile phone (e.g., a smartphone), a tablet computer, a cloud-hosted computer, cloud-hosted serverless processes, or other computing processes or devices may be used to access services provided by the cloud computing platform 101 (e.g., cloud computing service 103) by way of a network 106, such as the Internet or a private network.

In the description below, actions are ascribed to users, particularly consumers and providers. Such actions shall be understood to be performed concerning client device (or devices) 114 operated by such users. For example, notification to a user may be understood to be a notification transmitted to client device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user (consumer or provider) shall be understood to include performing such actions by the cloud computing service 103 in response to an instruction from that user.

In some embodiments, a users account object lists users authorized to access at least one target account (e.g., an account of a data provider or data consumer 115). In some embodiments, a roles account object configures privileges for the users to access the at least one target account. In some aspects, a warehouse object indicates compute resources (e.g., at least one virtual warehouse of the execution platform 110) for executing a workload associated with one or more databases of the data provider. In some embodiments, a resource monitor object configures monitoring usage of the compute resources.

The compute service manager 108 is also coupled to one or more metadata databases 112 that store metadata about various functions and aspects associated with the network-based data platform 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device. In some embodiments, metadata database 112 is configured to store account object metadata.

Figure 3:
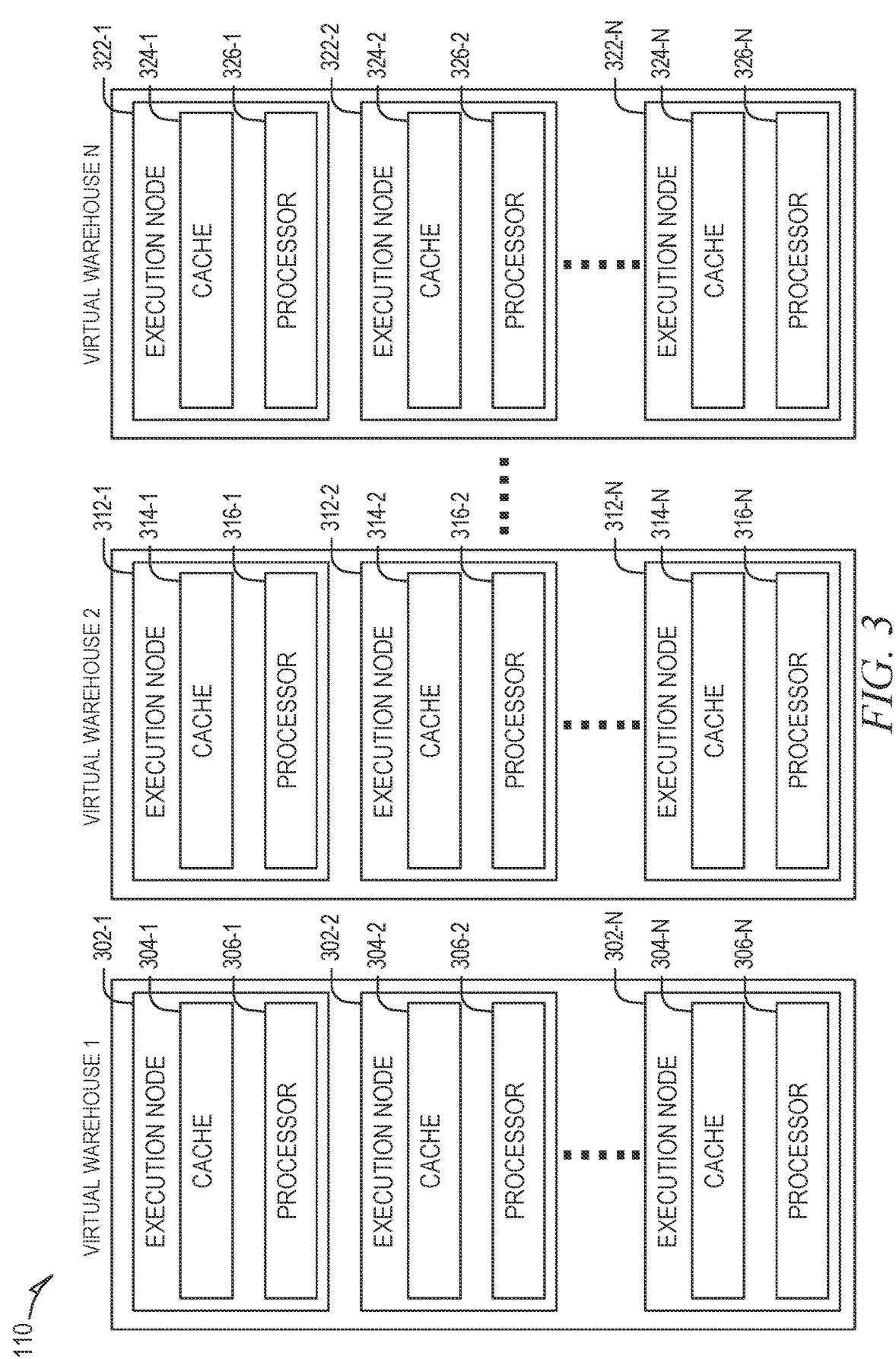
FIG. 3 is a block diagram illustrating components of an execution platform, in accordance with some embodiments of the present disclosure.

The compute service manager 108 is further coupled to the execution platform 110, which provides multiple computing resources that execute various data storage and data retrieval tasks. As illustrated in FIG. 3, the execution platform 110 comprises a plurality of compute nodes. The execution platform 110 is coupled to storage platform 104 and cloud storage platforms 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data-storage technology. Additionally, the cloud storage platform 104 may include distributed file systems (such as Hadoop Distributed File Systems (HDFS)), object storage systems, and the like. In some embodiments, at least one internal stage 126 may reside on one or more of the data storage devices 120-1-120-N, and at least one external stage 124 may reside on one or more of the cloud storage platforms 122.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

The compute service manager 108, metadata database(s) 112, execution platform 110, and storage platform 104 are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based data platform 102. Thus, in the described embodiments, the network-based data platform 102 is dynamic and supports regular changes to meet the current data processing needs.

During a typical operation, the network-based data platform 102 processes multiple jobs (e.g., operators of sub-plans) determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

According to various embodiments, the execution platform 110 executes a query according to a query plan determined by the compute service manager 108. As part of executing the query, the execution platform performs a table scan in which one or more portions of a database table are scanned to identify data that matches the query. More specifically, the database table can be organized into a set of files where each file comprises a set of blocks and each block stores at least a portion of a column of the database. Each execution node provides multiple threads of execution, and in performing a table scan, multiple threads perform a parallel scan of the set of blocks of a file, which may be selected from a scan set corresponding to a subset of the set of files into which the database is organized. That is, in performing a parallel scan, a first thread may scan a first block, a second thread may scan a second block, a third thread may scan a third block, and so forth, all in parallel. Further details regarding the parallel scan of a single file are discussed below in reference to FIGS. 4-7.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
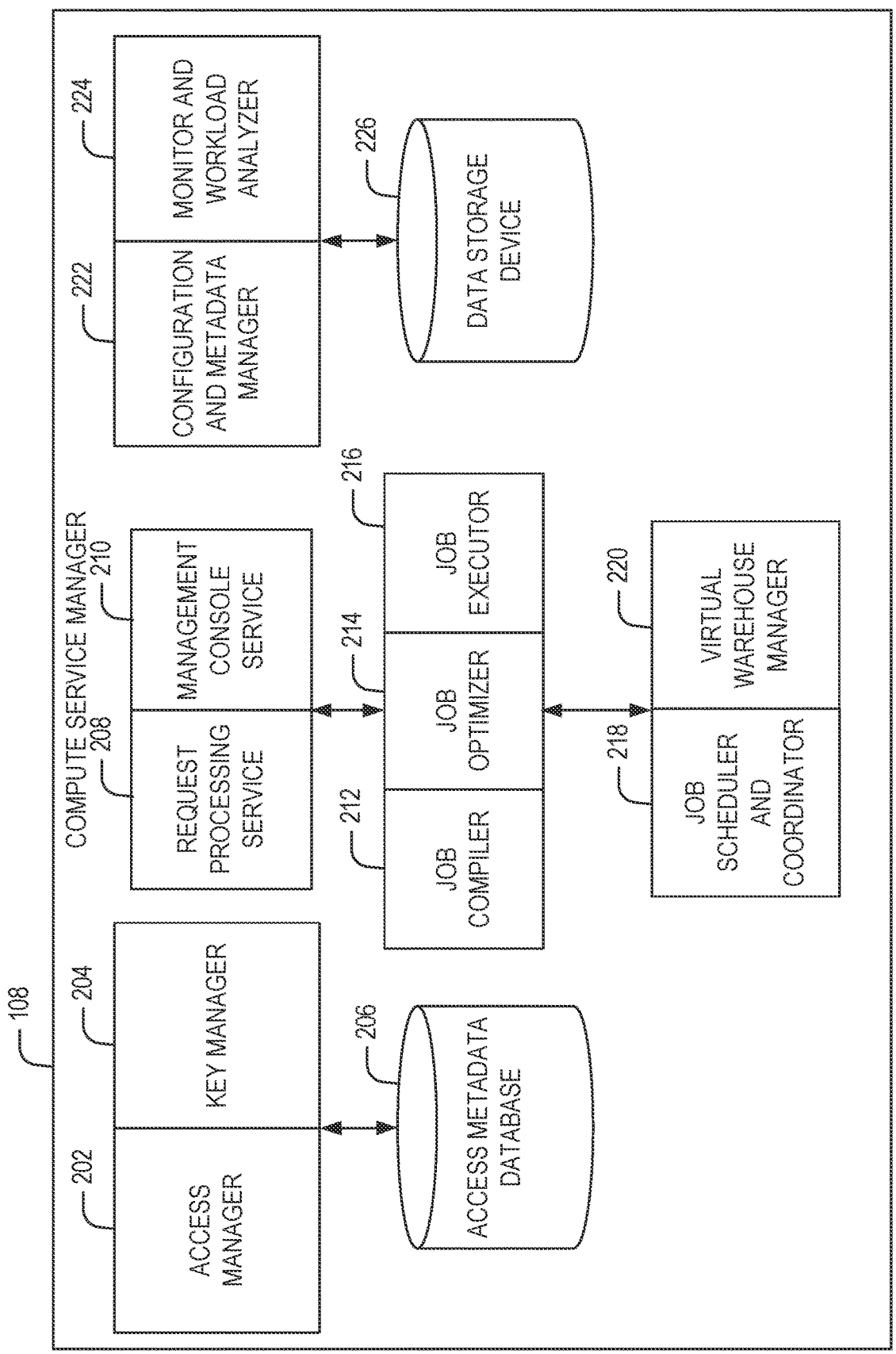
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system (or key manager) 204 coupled to an access metadata database 206, which is an example of the metadata database(s) 112. Access manager 202 handles authentication and authorization tasks for the systems described herein. The credential management system 204 facilitates the use of remotely stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries by one or more execution nodes of the execution platform 110. In executing a query plan directed toward a database organized into a set of files, an execution node can utilize multiple threads of execution to perform a parallel scan of blocks in a file. In performing a parallel scan, a single thread downloads the file and makes the blocks available for scanning by the other threads. Further details regarding the parallel scan of a single file are discussed below in reference to FIGS. 4-7.

Additionally, the compute service manager 108 includes a configuration and metadata manager 222, which manages the information related to the data stored in the remote data storage devices and the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based data platform 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based data platform 102. For example, data storage device 226 may represent buffers in execution platform 110, storage devices in storage platform 104, or any other storage device.

FIG. 3 is a block diagram illustrating components of the execution platform 110, in accordance with some embodiments of the present disclosure. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, virtual warehouses 1, . . . , N may be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location, and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the cloud storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

According to various embodiments, execution nodes can provide multiple threads of execution, and in executing a query, the multiple threads can perform a parallel scan of blocks from a single file of a database. That is, in performing a parallel scan, a first thread may scan a first block, a second thread may scan a second block, a third thread may scan a third block, and so forth, all in parallel. Further details regarding the parallel scan of a single file are discussed below in reference to FIGS. 4-7.

Figure 4:
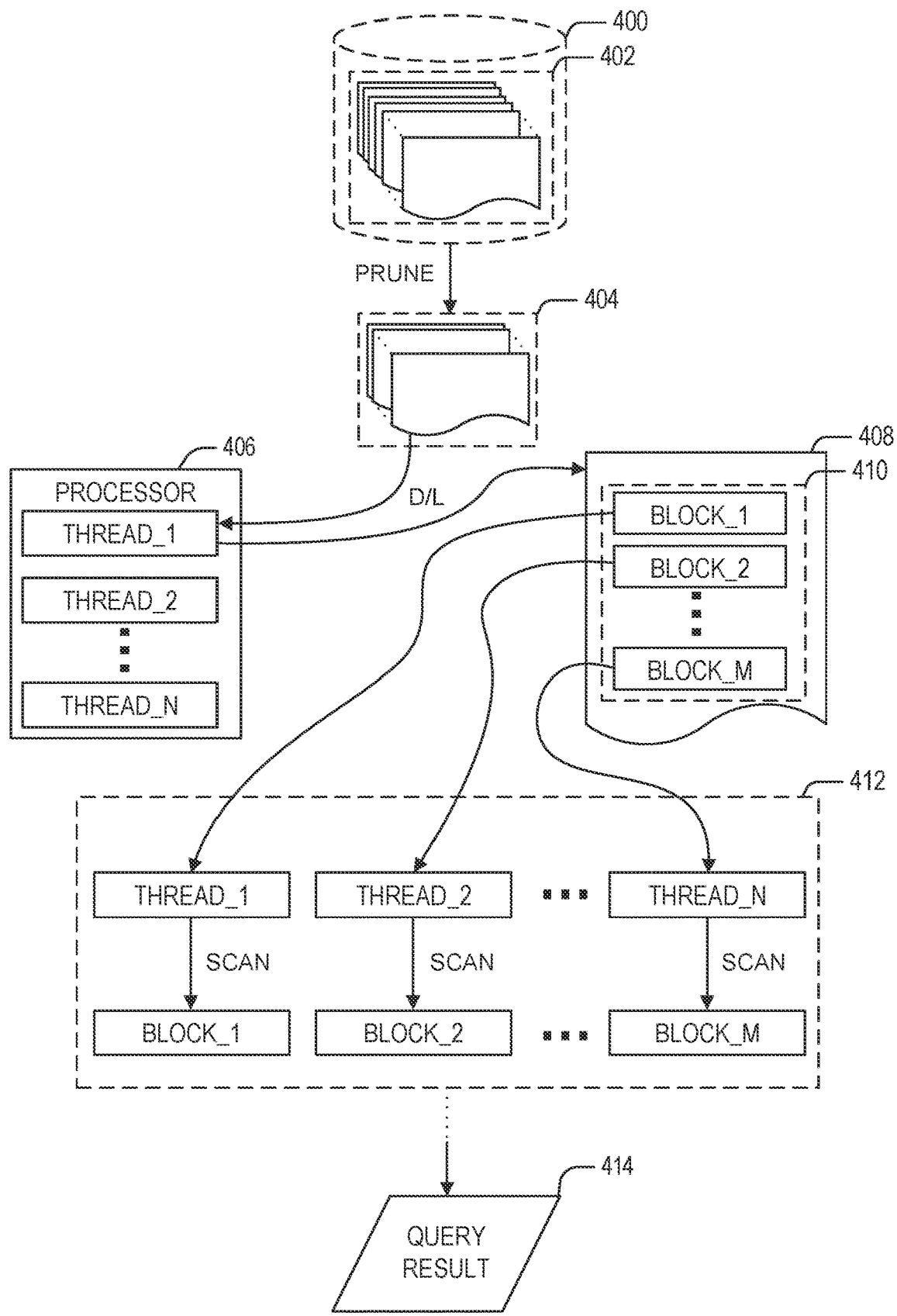
FIG. 4 is a block diagram illustrating operations of the network-based data platform in performing a parallel scan of a single file using multiple threads, in accordance with some embodiments of the present disclosure

FIG. 4 is a block diagram illustrating an example of the network-based data platform 102 in performing a parallel scan of a single file using multiple threads, in accordance with some embodiments of the present disclosure. In this example, a query directed to a database 400 is received by the network-based data platform (e.g., from a client device 114). As shown, the database 400 is organized into a set of files 402 and each file comprises a set of blocks. Each block includes at least a portion of a column of the database 400. As part of processing the query, the compute service manager 108 prunes the set of files 402 to determine a scan set 404, which is a subset of the set of files 402. In pruning the set of files 402, the compute service manager 108 identifies one or more files that are not pertinent to the query and eliminates the identified files from the scan set 404.

In executing the query, a first thread from among multiple threads of a processor 406 downloads a file 408 from the scan set 404. The file 408 includes a set of blocks 410. The processor 406 corresponds to an execution node of a virtual warehouse in the execution platform 110. Based on the number files in the scan set 404 being less than the number of execution threads provided by the processor 406, a parallel scan of the set of blocks 410 is performed by the multiple threads of the processor 406. The multiple threads, in turn, perform a parallel scan 412 of the set of blocks 410 to identify data that matches the query. For example, in parallel, the first thread scans a first block, a second thread scans a second block, a third thread scans a third block, and so forth. Depending on the number of blocks compared to the number of threads, any one or more of the threads may scan one or more additional blocks during the parallel scan. A query result 414 is generated based on the parallel scan 412, one or more additional scans of files from the scan set 404, and one or more additional operations based on the query. The query result 414 is provided by the data platform 102 responsive to the query (e.g., to the client device 114).

Figure 5:
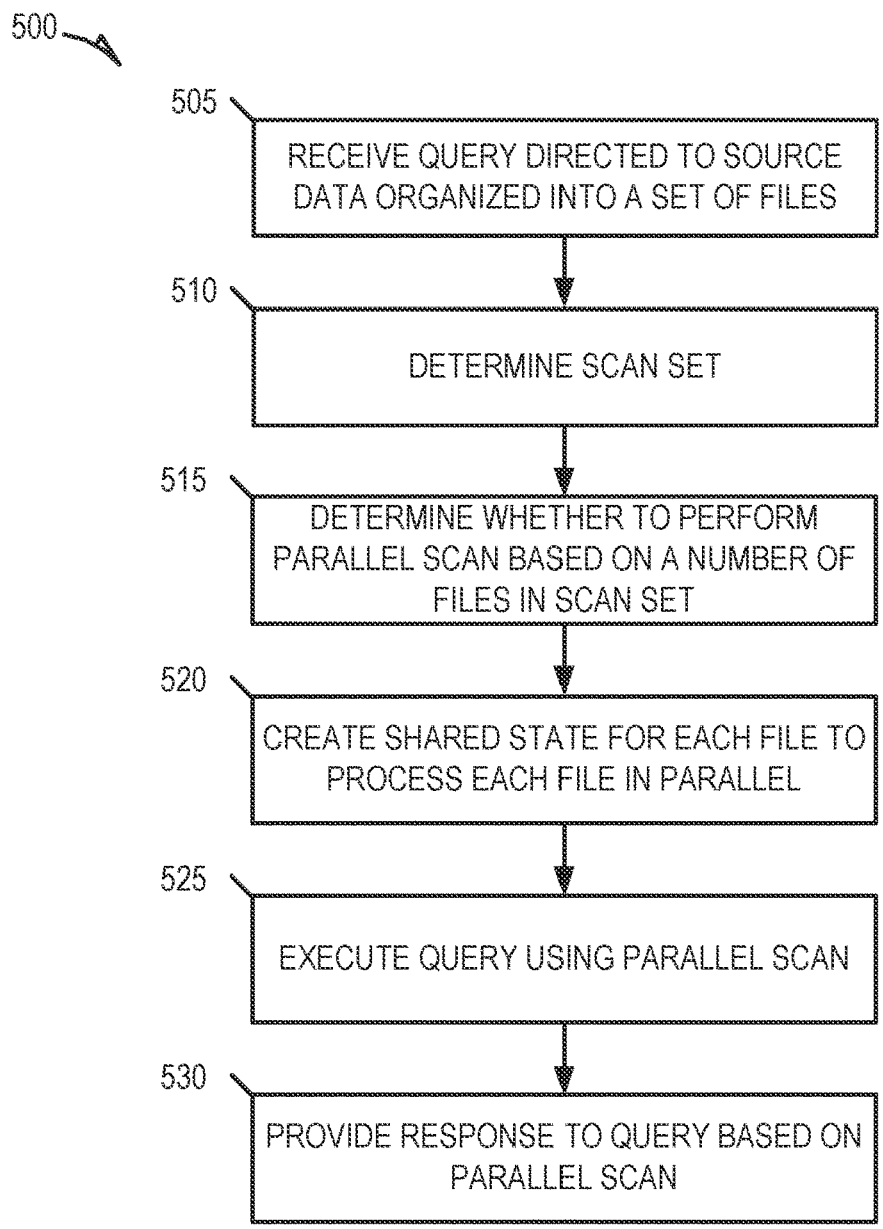
FIGS. 5-7 are flow diagrams illustrating operations of the network-based data platform in performing a method for parallel scanning of a single file using multiple threads, in accordance with some embodiments of the present disclosure.
Figure 6:
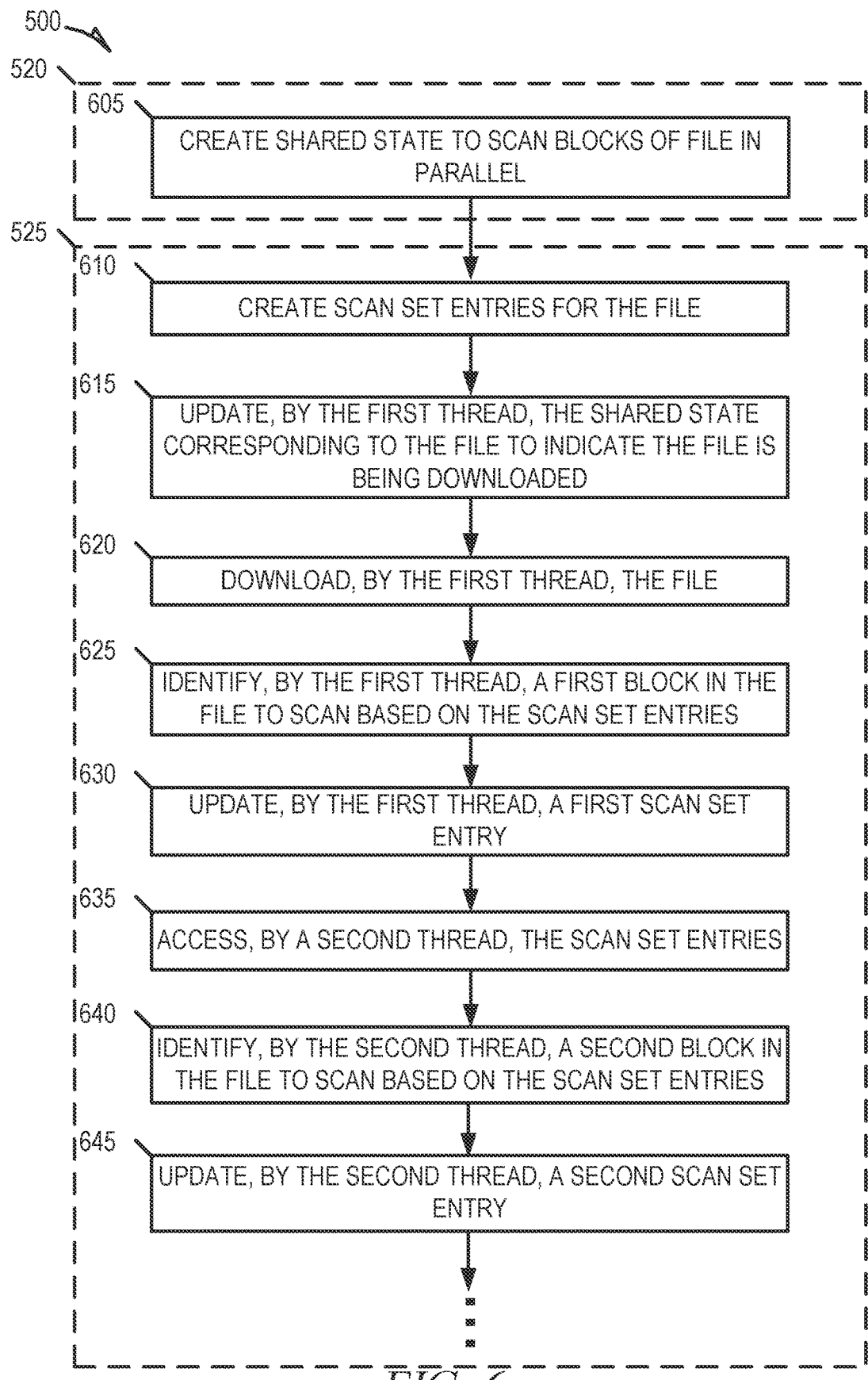
Figure 7:
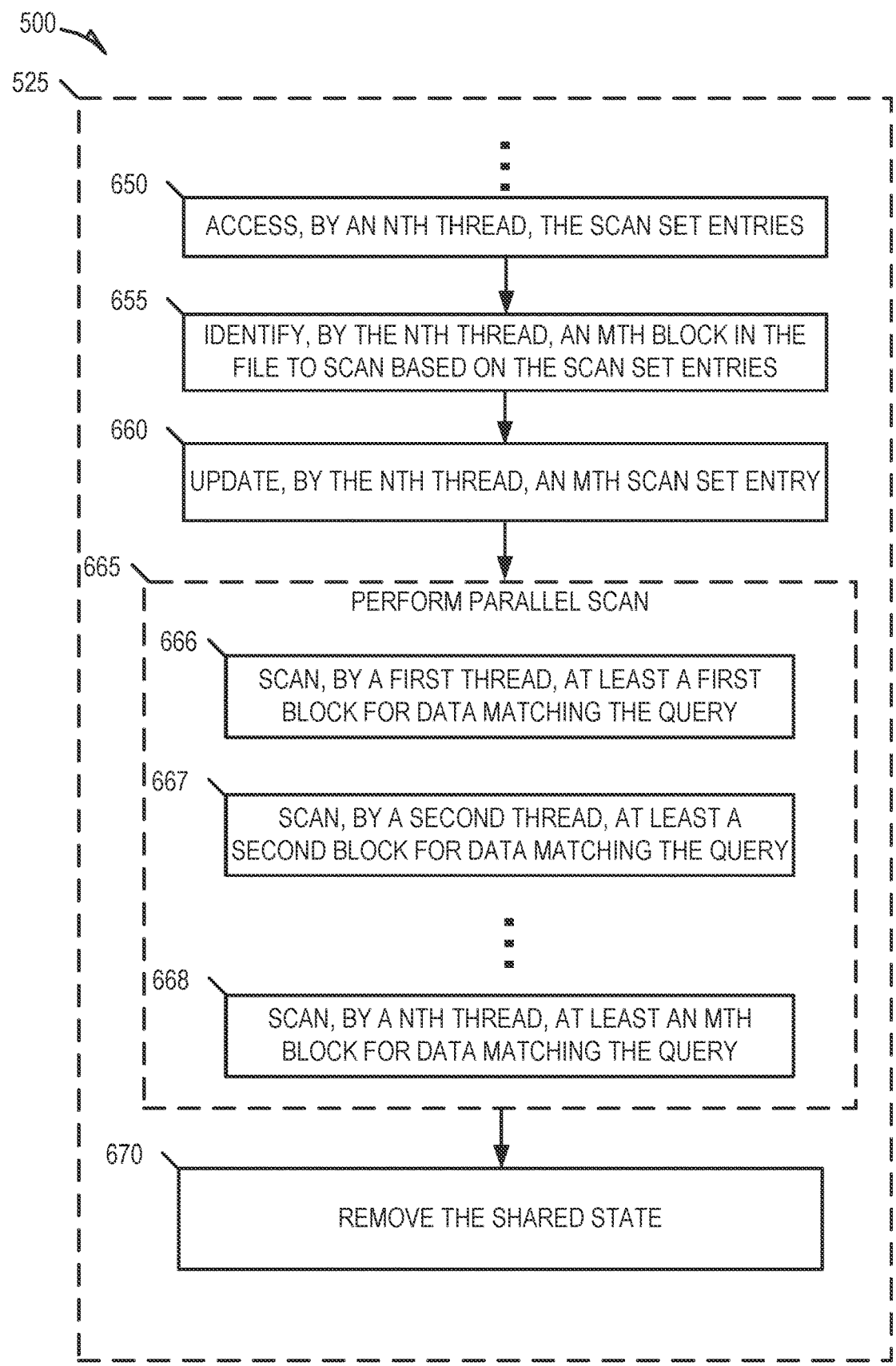

FIGS. 5-7 are flow diagrams illustrating operations of the network-based data platform 102 in performing a method 500 for parallel scanning of a single file using multiple threads, in accordance with some embodiments of the present disclosure. The method 500 may be embodied in computer-readable instructions for execution by one or more hardware components (e.g., one or more processors) such that the operations of the method 500 may be performed by components of data platform 102 such as one or more execution nodes of the execution platform 110. Accordingly, the method 500 is described below, by way of example with reference thereto. However, it shall be appreciated that method 500 may be deployed on various other hardware configurations and is not intended to be limited to deployment within the data platform 102.

Depending on the embodiment, an operation of the method 500 may be repeated in different ways or involve intervening operations not shown. Though the operations of the method 500 may be depicted and described in a certain order, the order in which the operations are performed may vary among embodiments, including performing certain operations in parallel or performing sets of operations in separate processes.

At operation 505, the data platform 102 receives a query (e.g., from a client device 114) directed to a database stored in database storage (e.g., storage platform 104 or a cloud-storage platform 122). The database is organized into multiple files and each file comprises a set of blocks. Each block comprises at least a portion of a column of the database. For a given column, all blocks are stored contiguously and blocks for different columns are row aligned. In some embodiments, the blocks are compression blocks in which data is compressed to reduce its size.

At operation 510, the compute service manager 108 determines a scan set for executing the query. The scan set comprises a subset of the set of files of the source data selected to scan for data matching the query. Determining the scan set can include pruning the set of files to eliminate one or more files determined to not be pertinent to the query.

At operation 515, execution nodes in the execution platform 110 that are responsible for executing the query determine whether to perform a parallel scan of blocks based on a number of files in the scan set. In particular, an execution node may determine that a parallel scan of blocks from a given file is to be performed if the number of files in the scan set is less than a number of available threads for executing the query. This determination may be performed at run-time by each execution node responsible for processing the query.

At operation 520, one or more shared states are generated for one or more files to facilitate parallel scanning. A shared state is generated by the execution node responsible for processing the file and based on determining the number of files in the scan set is less than a number of available threads for processing the file. A shared state can be a data object or other data structure that is accessible to threads of the execution node responsible for processing the corresponding file. The shared state includes information describing a state of processing for each file.

At operation 525, one or more execution nodes from the execution platform 110 execute the query to identify data matching the query from the scan set. Each execution node can use multiple threads of execution in executing the query. Based on the determination at operation 515, the one or more execution nodes execute the query by using the multiple threads to perform a parallel scan of blocks from each file in the scan set. For example, a given file from the scan set includes a set of blocks, each of which stores at least a portion of a column of the database to which the query is directed. An execution node from the execution platform 110 performs a parallel scan of the set of blocks using the multiple threads. That is, the multiple threads scan the set of blocks in parallel to identify data matching the query.

At operation 530, the data platform 102 provides a response to the query based in part on the parallel scan. The data platform 102 may, for example, provide a response to the client device 114 that includes data matching the query identified during the parallel scan of the set of blocks of the file.

Although only a single file is addressed in examples provided herein, it shall be appreciated that the execution of the query can include additional parallel scans of any one or more additional files from the scan set in parallel with the scan discussed above. Further, it shall be appreciated that one or more intervening operations including such additional parallel scans may be performed before arriving at the query response.

As shown in FIG. 6, the method 500 can further include operations 605, 610, 615, 620, 625, 630, 635, 640, and 645, consistent with some embodiments. In these embodiments, operation 605 can be performed as part of operation 520 where the compute service manager 108 creates a shared state for each file. At operation 605, an execution node from the execution platform 110 creates a shared state to scan blocks of a file from the scan set in parallel.

Consistent with these embodiments, operations 605, 610, 615, 620, 625, 630, 635, 640, and 645 can be performed as part of operation 525 where the execution platform 110 executes the query using a parallel scan of files.

At operation 610, the execution node creates a set of scan set entries based on a set of blocks from the file. Each scan set entry identifies a block to be scanned and includes an indication of whether the block is available for scanning. In some embodiments, the number of scan set entries in the set of scan set entries is based on a number of blocks in the file. In some embodiments, the first thread generates a fixed number of scan set entries based on a default value. Each scan set entry includes a pointer to the shared state.

At operation 615, a first thread updates the shared state corresponding to the file to indicate the file is being downloaded (e.g., from the storage platform 104 or cloud-storage platform(s) 122), and the first thread downloads the file, at operation 620.

At operation 625, the first thread identifies a first block to scan based on the set of scan set entries. In particular, the first thread identifies the first block based on a first scan set entry. At operation 630, the first thread updates the first scan set entry in the set of entries that corresponds to the first block. More specifically, the first thread updates the first scan set entry to indicate that the first block is being scanned.

At operation 635, a second thread accesses the set of scan set entries and identifies a second block to scan therefrom (at operation 640). More specifically, the second thread identifies the second block based on a second scan set entry. At operation 645, the second thread updates the second scan set entry corresponding to the second block to indicate the second block is being scanned.

As shown in FIG. 7, the method 500 can further include operations 650, 655, 660, 665, and 670. Consistent with these embodiments, the operations 650, 655, 660, 665, and 670 can be performed as part of operation 525 where the execution platform 110 executes the query.

At operation 650, an Nth thread accesses the set of scan set entries and identifies an Mth compression block to scan therefrom (at operation 655). More specifically, the Nth thread identifies the Mth compression block from an Mth scan set entry. At operation 660, the Nth thread updates the Mth scan set entry corresponding to the Mth block to indicate the Mth block is being scanned.

At operation 665, the execution node performs a parallel scan of the file. As shown, the operation 665, in some embodiments, includes operations 666, 667, and 668. Consistent with these embodiments, the operations 666, 667, and 668 are performed in parallel.

At operation 666, the first thread scans at least the first block identified from the file for data matching the query. At operation 667, the second thread scans at least the second block identified from the file for data matching the query. At operation 668, the Nth thread scans at least the Mth block identified from the file for data matching the query. In some embodiments, any one or more of the multiple threads can scan one or more additional blocks depending on the number of threads and the number of blocks.

At operation 670, a thread from the execution node removes the shared state corresponding to the file based on completion of the parallel scan of the blocks of the file. The thread that removes the shared state may, in some embodiments, correspond to the thread that is last to complete processing.

Described implementations of the subject matter can include one or more features, alone or in combination as illustrated below by way of example.

Example 1 is a method comprising: receiving a query directed to a database organized into a plurality of files; based on the query, accessing, at a first thread among multiple threads of execution of a processor, a file from the plurality of files, the file comprising a set of blocks, each block in the set of blocks storing at least a portion of a column of the database; performing, by at least the first and a second thread from among the multiple threads of the processor, a parallel scan of the set of blocks to identify data that matches the query; and providing a response to the query based in part on the parallel scan of the set of blocks.

Example 2 includes the method of Example 1, wherein the performing of the parallel scan of the set of blocks comprises: scanning, by the first thread, a first block from the set of blocks for data matching the query; and scanning, by the second thread, a second block from the set of blocks for data matching the query, the scanning of the second block being in parallel with the scanning of the first block.

Example 3 includes the method of any one or more of Examples 1 or 2, wherein the executing of the query further comprises: creating a set of scan set entries, each scan set entry identifying a block from among the set of blocks to scan for data that matches a query.

Example 4 includes the method of any one or more of Examples 1-3, wherein the executing of the query comprises: accessing, by the second thread, the set of scan set entries; and identifying, by the second thread, the second block to scan based on the set of scan set entries.

Example 5 includes the method of any one or more of Examples 1-4, wherein the executing of the query comprises: updating, by the second thread, a scan set entry in the set of scan set entries to indicate the second block is being scanned.

Example 6 includes the method of any one or more of Examples 1-5, wherein the executing of the query comprises: updating, by the first thread, a first scan set entry to indicate that the first block is being scanned.

Example 7 includes the method of any one or more of Examples 1-6, wherein the executing of the query further comprises: updating a second entry to indicate that a second block is being scanned.

Example 8 includes the method of any one or more of Examples 1-7, wherein the performing the parallel scan of the set of blocks comprises: scanning, by the first thread, a third block for data matching the query, the scanning of the third block being in parallel with the scanning of the first block and the second block.

Example 9 includes the method of any one or more of Examples 1-8, and further includes determining a scan set based on the plurality of files, the scan set comprising a subset of the plurality of files; and identifying the file from a scan set generated for the query based on the plurality of files.

Example 10 includes the method of any one or more of Examples 1-9, and further includes determining whether to perform the parallel scan of the set of blocks based on determining a number of files in the scan set is less than a number of available threads for executing the query.

Example 11 includes the method of any one or more of Examples 1-10, wherein a number of scan set entries in the set of scan set entries is based on a number of blocks in the file.

Example 12 includes the method of any one or more of Examples 1-10, wherein the set of scan set entries include a default number of scan set entries.

Example 13. A system comprising: one or more processors of a machine; and at least one memory storing instructions that, when executed by the one or more processors, cause the machine to perform operations implementing any one of example methods 1 to 12.

Example 14. A machine-readable storage device embodying instructions that, when executed by a machine, cause the machine to perform operations implementing any one of example methods 1 to 13.

Figure 8:
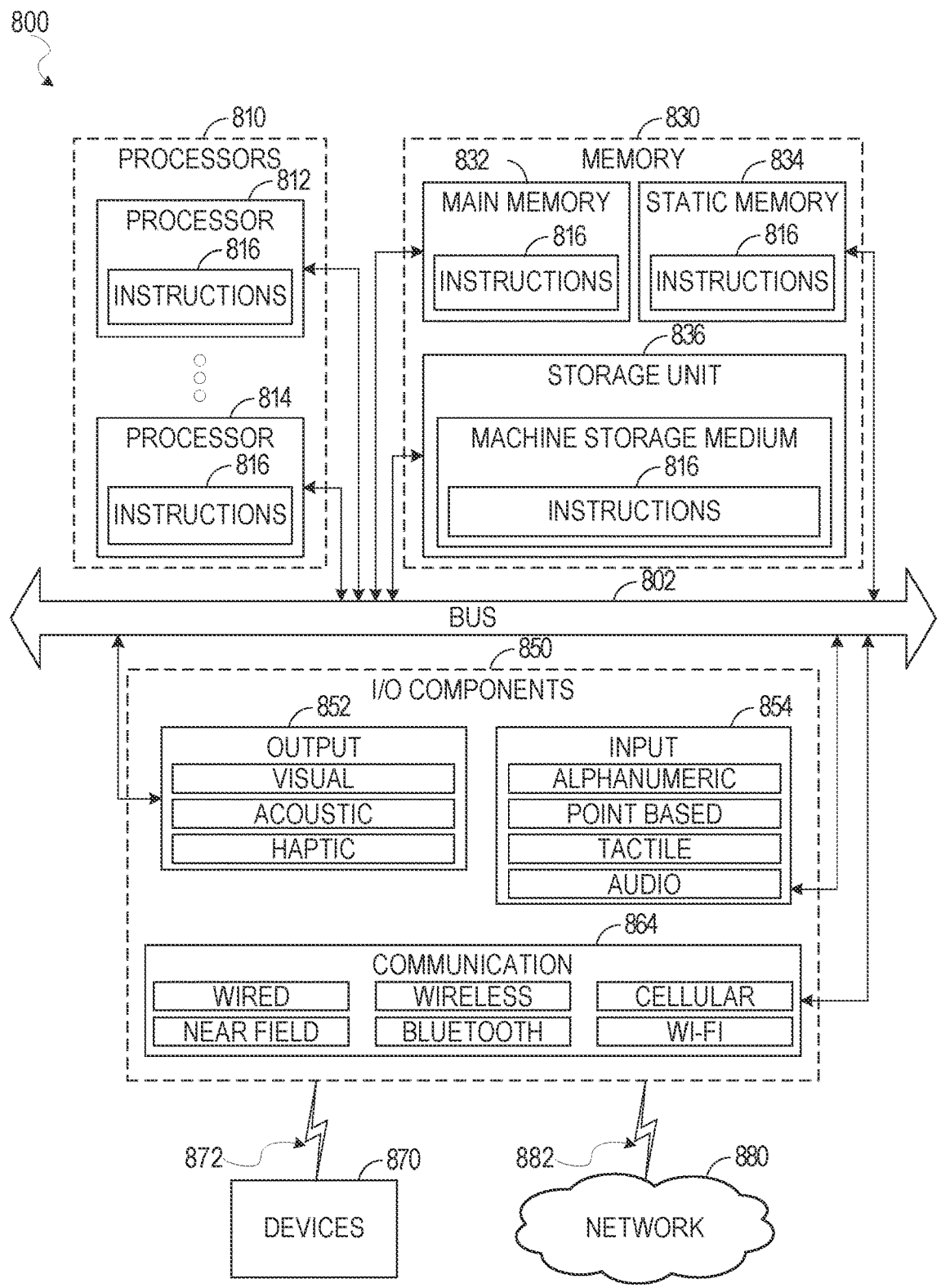
FIG. 8 illustrates a diagrammatic representation of a machine in the form of a computer system within which a set of instructions may be executed for causing the machine to perform any one or more of the methodologies discussed herein, in accordance with some embodiments of the present disclosure.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute any one or more operations of the method 500. In this way, the instructions 816 transform a general, non-programmed machine into a particular machine 800 (e.g., the compute service manager 108 or one or more execution nodes of the execution platform 110) that is specially configured to carry out any one of the described and illustrated functions in the manner described herein.

In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 includes processors 810, memory 830, and input/output (I/O) components 850 configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, and other communication components to provide communication via other modalities. The devices 870 may be another machine or any of a wide variety of peripheral devices (e.g., a peripheral device coupled via a universal serial bus (USB)). For example, as noted above, the machine 800 may correspond to any one of the compute service manager 108, the execution platform 110, and the devices 870 may include any other computing device described herein as being in communication with the data platform 102.

The various memories (e.g., 830, 832, 834, and/or memory of the processor(s) 810 and/or the storage unit 836) may store one or more sets of instructions 816 and data structures (e.g., software) embodying or utilized by any one or more of the methodologies or functions described herein. These instructions 816, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth.

The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the method 500 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A data platform comprising:
at least one hardware processor providing multiple threads of execution; and
at least one memory storing instructions that cause the at least one hardware processor to execute a query directed to a database organized into a plurality of files, the executing of the query comprising:
downloading, by an execution node comprising the multiple threads of execution including first and second threads among multiple threads of execution, a single file from the plurality of files, the single file comprising a set of blocks;
distributing the set of blocks of the single file among the multiple threads of execution;
in response to distributing the set of blocks of the single file among the multiple threads of execution, performing, by at least the first and second threads of the execution node to which the single file comprising the set of blocks has been downloaded, a parallel scan of the set of blocks of the single file to identify data that matches the query; and
the instructions further causing the at least one hardware processor to provide a response to the query based in part on the parallel scan of the set of blocks.

2. The data platform of claim 1, wherein the performing of the parallel scan of the set of blocks comprises:
scanning, by the first thread, a first block from the set of blocks for data matching the query; and
scanning, by the second thread, a second block from the set of blocks for data matching the query, the scanning of the second block being in parallel with the scanning of the first block.

3. The data platform of claim 2, wherein the executing of the query further comprises:
creating, by the first thread, a set of scan set entries, each scan set entry identifying a block from among the set of blocks to scan for data that matches the query.

4. The data platform of claim 3, wherein the executing of the query further comprises:
accessing, by the second thread, the set of scan set entries; and
identifying, by the second thread, a second block to scan based on the set of scan set entries.

5. The data platform of claim 4, wherein the executing of the query further comprises:
updating, by the second thread, a scan set entry in the set of scan set entries to indicate the second block is being scanned.

6. The data platform of claim 3, wherein the executing of the query further comprises:
updating, by the first thread, a scan set entry to indicate that the first block is being scanned.

7. The data platform of claim 3, wherein a number of scan set entries in the set of scan set entries is based on a number of blocks in the single file.

8. The data platform of claim 3, wherein the set of scan set entries include a default number of scan set entries.

9. The data platform of claim 3, wherein the executing of the query further comprises:
   accessing, by a third thread from among the multiple threads, the set of scan set entries;
   identifying, by the third thread, a third block to scan based on the set of scan set entries;
   updating, by the third thread, a scan set entry to indicate the third block is being scanned; and
   scanning, by the third thread, the third block identified based on the set of scan set entries, the scanning of the third block being in parallel with the scanning of the first block and the second block.

10. The data platform of claim 2, wherein the performing of the parallel scan of the set of blocks comprises:
   scanning, by the first thread, a third block for data matching the query, the scanning of the third block being in parallel with the scanning of the first block and the second block.

11. The data platform of claim 1, wherein the single file is included in a scan set generated for the query based on the plurality of files, the scan set comprising a subset of the plurality of files.

12. The data platform of claim 1, wherein the parallel scan of the set of blocks is performed based on determining several files in the scan set is less than several available threads for executing the query.

13. A method comprising:
   based on a received query directed to a database organized into a plurality of files, accessing, at a first thread among multiple threads of execution of a processor, a single file from the plurality of files, the single file comprising a set of blocks, each block in the set of blocks storing at least a portion of a column of the database;
   distributing the set of blocks of the single file among the multiple threads of execution;
   in response to distributing the set of blocks of the single file among the multiple threads of execution, performing, by at least the first thread and a second thread of an execution node to which the single file comprising the set of blocks has been downloaded, a parallel scan of the set of blocks of the single file to identify data that matches the query; and
   providing a response to the query based in part on the parallel scan of the set of blocks.

14. The method of claim 13, wherein the performing of the parallel scan of the set of blocks comprises:
   scanning, by the first thread, a first block from the set of blocks for data matching the query; and
   scanning, by the second thread, a second block from the set of blocks for data matching the query, the scanning of the second block being in parallel with the scanning of the first block.

15. The method of claim 14, wherein the executing of the query further comprises:
   creating a set of scan set entries, each scan set entry identifying a block from among the set of blocks to scan for data that matches a query.

16. The method of claim 15, wherein the executing of the query further comprises:
   accessing, by the second thread, the set of scan set entries; and
   identifying, by the second thread, the second block to scan based on the set of scan set entries.

17. The method of claim 16, wherein the executing of the query further comprises:
   updating, by the second thread, a scan set entry in the set of scan set entries to indicate the second block is being scanned.

18. The method of claim 15, wherein the executing of the query further comprises:
   updating, by the first thread, a first scan set entry to indicate that the first block is being scanned.

19. The method of claim 18, wherein the executing of the query further comprises:
   updating a second entry to indicate that a second block is being scanned.

20. The method of claim 14, wherein the performing the parallel scan of the set of blocks comprises:
   scanning, by the first thread, a third block for data matching the query, the scanning of the third block being in parallel with the scanning of the first block and the second block.

21. The method of claim 13, further comprising:
   determining a scan set based on the plurality of files, the scan set comprising a subset of the plurality of files; and
   identifying the single file from a scan set generated for the query based on the plurality of files.

22. The method of claim 13, further comprising:
   determining whether to perform the parallel scan of the set of blocks based on determining a number of files in the scan set is less than a number of available threads for executing the query.

23. A non-transitory computer-storage medium comprising instructions that, when executed by a processor of a machine, configure the machine to perform operations comprising:
   based on a received query directed to a database organized into a plurality of files, accessing, at a first thread among multiple threads of execution of a processor, a single file from the plurality of files, the single file comprising a set of blocks, each block in the set of blocks storing at least a portion of a column of the database;
   distributing the set of blocks of the single file among the multiple threads of execution; and
   in response to distributing the set of blocks of the single file among the multiple threads of execution, performing, by at least the first thread and a second thread of an execution node to which the single file comprising the set of blocks has been downloaded, a parallel scan of the set of blocks of the single file to identify data that matches the query.

24. The non-transitory computer-storage medium of claim 23, wherein the performing of the parallel scan of the set of blocks comprises:
   scanning, by the first thread, a first block from the set of blocks for data matching the query; and
   scanning, by the second thread, a second block from the set of blocks for data matching the query, the scanning of the second block being in parallel with the scanning of the first block.

25. The non-transitory computer-storage medium of claim 24, wherein the executing of the thread further comprises:
   creating a set of scan set entries, each scan set entry identifying a block from among the set of blocks to scan for data that matches the query.

26. The non-transitory computer-storage medium of claim 25, wherein executing of the query further comprises:
   accessing, by the second thread, the set of scan set entries; and
   identifying, by the second thread, the second block to scan based on the set of scan set entries.

27. The non-transitory computer-storage medium of claim 26, wherein the executing of the query further comprises:
   updating, by the second thread, a scan set entry to indicate that the second block is being scanned.

28. The non-transitory computer-storage medium of claim 25, wherein the executing of the query further comprises:
   updating, by the first thread, a scan set entry to indicate that the first block is being scanned.

29. The non-transitory computer-storage medium of claim 23, wherein the operations further comprise:
   determining a scan set based on the plurality of files, the scan set comprising a subset of the plurality of files; and
   identifying the single file from a scan set generated for the query based on the plurality of files.

30. The non-transitory computer-storage medium of claim 23, wherein the operations further comprise determining whether to perform the parallel scan of the set of blocks based on determining a number of files in the scan set is less than a number of available threads for executing the query.

* * * * *